United States Patent Office 2,805,977
Patented Sept. 10, 1957

2,805,977

SUSTAINED RELEASE PHARMACEUTICAL PREPARATION

Manford J. Robinson, Moorestown, N. J., and Edward V. Svedres, Ambler, Pa., assignors to Smith, Kline & French Laboratories, Philadelphia, Pa., a corporation of Pennsylvania No Drawing. Application January 4, 1955, Serial No. 479,852

13 Claims. (Cl. 167—82)

This invention relates to a sustained release pharmaceutical preparation and, more particularly, relates to such a preparation in liquid form.

Sustained release forms of medication are known to the art. Such forms of medication are distinguished from enteric coated medication, which prevents the release of the medication in the stomach and provides for substantially immediate release of the medication on reaching the intestines. Sustained release forms of medication provide for a sustained release of the medication in the gastro-intestinal tract, including the stomach, over an extended period of time, for example, 6 hours or more.

The successfully marketed sustained release preparations to date are in solid form. Notably they have taken the form of small coated pellets in a capsule. Some sustained release has also been achieved in tablet form. Sustained release preparations in solid form are unsatisfactory in certain cases. For example, some patients are unable to swallow tablets or capsules. A sustained release preparation in liquid form is desirable for such patients and has the additional advantages normally associated with liquid pharmaceutical preparations.

The liquid preparation in accordance with this invention provides sustained release of a medicament comparable to that achieved with solid preparations. Further, the preparation of this invention provides a suspension of medicament containing particles which will remain substantially uniform for an extensive period of time.

The preparation in accordance with this invention comprises a large number of fine sustained release particles in combination with an aqueous vehicle. More specifically, the sustained release particles comprise a finely powdered medicament dispersed in a time delay material which is resistant to disintegration in the gastro-intestinal tract and which will slowly disintegrate therein, including in the stomach. These sustained release particles will have a size not larger than 100 mesh (U. S.). Particles having a smaller size may be very satisfactorily utilized. However, as a matter of convenience, it is preferred that the particles not have a size smaller than 0.5 microns.

Any medicament having a particle size of 200 mesh, or finer, can be satisfactorily used to form the sustained release particles. Thus, for example, the medicament may be a sympathomimetic agent, such as, for example, amphetamine sulfate, dextro-amphetamine sulfate, racemic amphetamine sulfate, racemic or d-desoxyephedrine hydrochloride, an antispasmodic agent, such as, for example, hyoscyamine, atropine, or scopolamine hydrobromide, an antihistamine, such as, for example, chloroprophenpyridamine maleate, a barbiturate, such as, for example, phenobarbital, barbital, amobarbital, an antibiotic, such as, for example, procaine penicillin, etc.

In accordance with this invention, the time delay material is a substantially water insoluble material resistant to disintegration in the gastro-intestinal tract and providing for a gradual release of the medicament in said tract. The time delay material may be, for example, a wax, a fatty acid, alcohol or ester, alone, or an admixture thereof.

The wax may be paraffin wax; a petrolatum wax; a mineral wax such as ozokerite, ceresin, utah wax or montan wax; a vegetable wax such as, for example, carnauba wax, Japan wax, bayberry wax, flax wax; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, cetyl palmitate, myricyl cerotate, cetyl myristate, ceryl palmitate, ceryl cerotate, myricyl melissate, stearyl palmitate, stearyl myristate, lauryl laurate.

The fatty acid may have from 10 to 22 carbon atoms and may be, for example, decenoic, docosanoic, stearic, palmitic, lauric or myristic acid.

The fatty alcohols may have from 14 to 31 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, or glyceryl tridecenoate.

Other substantially water insoluble time delay materials may also be used. Thus, for example, a film forming silicone such as dimethyl silicone (Dow Corning—DC 1208 or DC 1205 and General Electric SC 77 or SF 99). A methylphenyl silicone or a diphenyl silicone (Dow Corning 1107) is satisfactory. Similarly, a silicone modified alkyd resin may be used. By way of still further example, it is satisfactory to use cellulose ethers such as ethylcellulose or hydroxyethyl cellulose; cellulose esters such as cellulose acid phthalate, cellulose acetate, cellulose acetate phthalate or cellulose nitrate; polyvinyl compounds such as PVA (polyvinyl alcohol), polyvinyl acetate, polyvinyl butyrates, or polyvinyl phthalate; polystyrene derivative such as polystyrenemaleic acid; polyacrylic derivatives such as polyacrylic acid, polyacrylionitrile, polymethylacrylate or polybutylacrylate.

The time delay material is liquefied simply by heating and/or by the use of an organic solvent therefor. The solvent may be, for example, carbon tetrachloride, chloroform, trichloroethylene, petroleum ether, benzene, toluene, ethyl acetate, xylene, nitrobenzene, acetone, ether, carbon disulfide, methyl ethyl ketone and alcohols, such as, methyl, ethyl, and isopropyl alcohol.

The amount of time delay material will vary within wide limits but preferably will be present in an amount to provide a sustained release of the medicament over a period of up to about 6 to about 10 hours.

The sustained release particles of this invention can be prepared utilizing several different methods. In all of the methods the selected medicament is mixed with the time delay material in the proportions desired in the final sustained release particles. This mixing can be accomplished by heating time delay material to a molten state and then admixing the medicament with it, or, alternatively, by liquefying the time delay material in a suitable organic solvent, such as, for example, carbon tetrachloride, chloroform, trichloroethylene, petroleum ether, benzene, toluene, ethyl acetate, xylene, nitrobenzene, acetone, ether, carbon disulfide, methyl ethyl ketone, and methyl, ethyl or isopropyl alcohol.

After the medicament and the time delay material have been thoroughly admixed, the mixture may be solidified and ground to the desired particle size. In lieu of being solidified and then ground, the suspension of the medicament in the time delay material may be spray dried or spray crystallized. The spray drying or crystallizing will be carried out in apparatus conventionally used for spray drying or spray crystallizing and which is well known to the art. The spray drying or crystallizing produces particles comprising a dispersion of the powdered medicament in the time delay material and is particularly satisfactory for the formation of such particles where a very small particle size is desired.

In accordance with this invention, the above defined sustained release particles containing medicament and time delay material are in an aqueous vehicle which preferably contains, in addition to water, a surface active agent which decreases the surface tension of the water and which will not adversely affect the time delay material.

The surface active agent may be any known non-toxic surface active agent and may be an anionic, cationic or non-ionic agent. By way of example of anionic surface active agents are sulfonic acids and the salts or sulfonated esters such as sodium lauryl sulfate, sodium sulfoethyl oleate, dioctyl sodium sulfosuccinate, cetyl sulfate sodium or myristyl sulfate sodium are satisfactory.

By way of further example, cetyl pyridinium chloride, cetyl trimethyl ammonium bromide, diethylmethyl octyl ammonium chloride, benzalkonium chloride and benzethonium chloride are satisfactory cationic surface active agents. By way of example of satisfactory non ionic surface active agents, it is satisfactory to use glycol monolaurate, polyoxyethylene stearate, polyoxyethylene sorbitan monooleate, polyoxyethylene sorbitan monolaurate, sorbitan monooleate or sorbitan monolaurate.

Preferably the specific gravity of the sustained release particles (at 20° C. referred to water at 4° C.) will be within the range of from about 1 to about 2 and advantageously substantially from about 1 to about 1.5. Further, the sustained release particles will preferably have a density of from about 100% to about 150% of the aqueous vehicle at 20° C. The density relationship between the sustained release particles and the vehicle can be adjusted by increasing the density of the vehicle by adding to the water, for example, sucrose, honey or chocolate syrup. Again, this relationship can be adjusted through the incorporation of fillers with the medicament in the time delay material. Thus, for example, to increase the density of the particles, calcium di-phosphate, calcium silicate, calcium sulfate dihydrate, magnesium oxide, magnesium di-phosphate, magnesium silicate or silicon dioxide can be used. To lower the density of the particles, comminuted cetyl alcohol, stearyl alcohol, myristic acid and/or glyceryl monostearate or glyceryl tristearate can be mixed in the particle along with the medicament by the proper selection of solvents and melting points with reference to the sustained release material.

The uniformity of the dispersion of the sustained release particles in the aqueous vehicle can be maintained for a greater period of time if a thickening agent is added to the vehicle. Exemplary of satisfactory thickening agents are tragacanth, acacia, carboxymethyl cellulose, chocolate syrup, bentonite, honey, agar, pectin, alginic acid derivatives such as, for example, potassium, sodium or ammonium alginate and methyl cellulose.

It is also preferred to include from about .001% to about 1%, by weight of the preparation of a deflocculating agent, for example, sodium hexametaphosphate, ammonium metaphosphate, potassium metaphosphate, sodium tetraphosphate, sodium tripolyphosphate, sodium lignosulfonate, calcium lignosulfonate.

The final product will preferably have a viscosity in the range of from 100 to 10,000 centipoises at 20° C. and the sustained release particles substantially uniformly suspended in the aqueous vehicle. Preferably, the surface active agent, when present, will be in an amount to provide a water surface tension of less than about 50 dynes per centimeter and preferably less than 35 dynes per centimeter.

Other conventional ingredients of liquid pharmaceutical preparations may be added, such as, preservatives, for example, methyl or propyl paraben, stabilizing agents, such as, propylene glycol, flavoring agents, such as, oil of orange and the like.

If desired, a pre-mix of all of the essential ingredients, except the water, can be formed for later reconstitution with water.

The invention will further be clarified by the following specific examples:

EXAMPLE 1

*Medicament dry mix*

| | Grams |
|---|---|
| Sulfamethylthiadiazole (400 mesh) | 100.0 |
| Castor wax (hydrogenated castor oil) | 75.0 |
| Chloroform | 250.0 |

The chloroform is warmed to 55–60° C. and the castor wax dissolved in the warm chloroform. When solution is complete, the sulfamethylthiadiazole is added and thoroughly mixed in the solution. The thus formed suspension is spray dried using an inlet temperature of 90° C. and an outlet temperature of 40° C. The thus formed powder (86% yield), having an average particle diameter of about 20 microns, is thoroughly mixed with an aqueous vehicle having the following formula:

| | Gms./100 ml. |
|---|---|
| Tragacanth, USP | 1.000 |
| Methylparaben, USP | 0.0625 |
| Propylparaben, USP | 0.0125 |
| Sodium lauryl sulfate | 0.0500 |
| Sucrose, USP | 24.000 |
| Distilled water, q. s. 100.000 ml. | |

The following procedure is used: the methyl and propyl parabens are dissolved with water equal to 40% of the final volume. The tragacanth is then added and thoroughly mixed to this solution and then the sucrose and sodium lauryl sulfate are dissolved in the solution. Sufficient water is then added to bring the volume up to 100 ml. and the batch is thoroughly mixed.

Approximately 7.0 grams of the medicament dry mix is placed in a mortar and 2 ounces of the vehicle is added gradually with mixing. Mixing is continued until a smooth mixture is obtained.

EXAMPLE 2

*Medicament dry mix*

| | Grams |
|---|---|
| Sulfamethylthiadiazole (400 mesh) | 100.0 |
| Castor wax, M. P. 80° C. (hydrogenated castor oil) | 200.0 |

The castor wax is heated to 140° C. and the sulfamethylthiadiazole mixed thoroughly with the castor wax. The thus formed suspension is spray crystallized. The particles (88% yield) having an average diameter of 34–38 microns are then thoroughly mixed with an aqueous vehicle having the following formula:

| | Gms./100 ml. |
|---|---|
| Sodium carboxymethyl cellulose | 0.5000 |
| Methylparaben, USP | 0.0625 |
| Propylparaben, USP | 0.0125 |
| Sodium hexametaphosphate | 0.1000 |
| Dioctylsodiumsulfosuccinate | 1.0000 |
| Sucrose, USP | 24.0000 |
| Distilled water, q. s. 100.0000 mls. | |

The following procedure is used: the methyl and propyl parabens are dissolved in water equal to 40% of the final volume. The sodium carboxymethyl cellulose is added and thoroughly mixed. The dioctylsodiumsulfosuccinate and sodium hexametaphosphate are then dissolved in the solution. Finally, the sucrose is added and mixed and then sufficient water is added to bring the volume up to 100 ml. and the batch is thoroughly mixed.

Approximately 12 grams of the medicament dry mix is placed in a mortar and 2 ounces of the vehicle is added gradually with mixing. Mixing is continued until a smooth mixture is obtained.

EXAMPLE 3

*Medicament dry mix*

| | Grams |
|---|---|
| Sulfamethylthiadiazole (200 mesh) | 444 |
| Glyceryl distearate | 556 |

The glyceryl distearate is melted. The sulfamethylthiadiazole powder is thoroughly mixed with the glyceryl distearate melt. The mixture is cooled, while constantly stirred, until it congeals to a hard mass. The thus formed mass is flaked and then ground and sieved so that it passes through a #100 mesh screen and remains on a #200 mesh screen. The thus formed particles are then suspended in an aqueous vehicle having the following formula:

| | | |
|---|---|---|
| Methylparaben, USP | gm. | 0.300 |
| Propylparaben, USP | gm. | 0.060 |
| Propylene glycol, USP | cc. | 15.000 |
| Sodium lauryl sulfate | gm. | 0.050 |
| Honey, NF | gm. | 150.000 |
| Distilled water | cc. | 150.000 |
| Chocolate syrup, q. s | cc. | 820.000 |

The following procedure is used: the methyl and propyl parabens are dissolved in the propylene glycol. While mixing, the water and honey are successively added. The sodium lauryl sulfate is then dissolved in the solution and the batch brought up to a volume of 820 cc. with chocolate syrup and thoroughly mixed.

18 grams of the medicament dry mix is now added to a mortar to which 82 cc. of the vehicle is gradually added with mixing. Mixing is continued until a smooth mixture is obtained.

EXAMPLE 4

*Medicament dry mix*

| | Grams |
|---|---|
| Dextroamphetamine sulfate, 100% (200 mesh) | 10 |
| Terra alba, imported (200 mesh) | 384 |
| Glyceryl distearate | 500 |

The glyceryl distearate is melted. A mixture of the dextroamphetamine and terra alba is added and thoroughly mixed with the glyceryl distearate melt. This mixture is then cooled, while constantly stirred, until it congeals to a hard mass. The thus formed mass is ground and then sieved through a 100 mesh screen. The thus formed particles are then thoroughly mixed with an aqueous vehicle having the following formula:

| | | |
|---|---|---|
| Methylparaben, USP | gm. | 0.300 |
| Propylparaben, USP | gm. | 0.060 |
| Propylene glycol, USP | cc. | 60.000 |
| Methyl cellulose, NF | gm. | 3.550 |
| Water | cc. | 41.500 |
| Ice | gm. | 125.000 |
| Glucose, liquid, USP | gm. | 18.000 |
| Oil of orange, USP | cc. | 7.100 |
| Calcium sulfate dihydrate | gm. | 110.000 |
| Syrup, USP, q. s | cc. | 730.000 |

The following procedure is used: the methyl and propyl parabens are dissolved in the propylene glycol. The methyl cellulose is wetted with hot water and then cooled by the addition of ice. The methyl cellulose mixture is then added to the propylparaben and propylene glycol mixture and the batch well stirred. The calcium sulfate dihydrate and oil of orange are added to the batch with constant stirring and the mixing continued for 30 minutes, near the end of which time the glucose is added. The batch is brought up to a volume of 730 cc. with syrup and mixed for an additional 2 hours.

27 grams of the dry medicament mix is placed in a mortar to which 73 cc. of the vehicle is gradually added with mixing. The mixing is continued until a smooth mixture is obtained.

It is not desired to be limited except as set forth in the following claims.

What is claimed is:

1. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, fatty alcohol of from 14 to 31 carbon atoms, a glyceryl ester of a fatty acid having from 10 to 22 carbon atoms, a cellulose ether, and a cellulose ester and said particles being not larger than 100 mesh and an aqueous vehicle for said particles.

2. An oral liquid medicinal preparation in accordance with claim 1, characterized in that said medicinal particles are spray-crystallized medicinal particles.

3. An oral liquid medicinal preparation in accordance with claim 2, characterized in that said time delay material is hydrogenated castor oil.

4. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles and a surface active agent to lower the surface tension of the water.

5. An oral liquid medicinal preparation in accordance with claim 4, characterized in that said medicinal particles are spray-crystallized medicinal particles.

6. An oral liquid medicinal preparation in accordance with claim 5, characterized in that said time delay material is hydrogenated castor oil.

7. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles and a surface active agent to lower the surface tension of the water to less than 50 dynes per centimeter.

8. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles, and a thickening agent to retard the movement of the particles in the vehicle.

9. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles, a surface active agent to lower the surface tension of the water and a thickening agent to retard the movement of the particles in the vehicle.

10. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles and a deflocculating agent.

11. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh, an aqueous vehicle for said particles, a surface active agent to lower the surface tension of the water and a deflocculating agent.

12. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh and having a specific gravity at 20° C. related to water at 4° C. of from about 1 to about 2, an aqueous vehicle for said particles, said particles having a density of from about 100% to about 150% of said vehicle at 20° C.

13. An oral liquid medicinal preparation providing a sustained release of solid medicament comprising medicinal particles comprising finely divided medicament having a maximum particle size of 200 mesh dispersed in solid time delay material resistant to disintegration in the gastro-intestinal tract and providing for the gradual release of the medicament in said tract, said solid time delay material being selected from the group consisting of a wax, a fatty alcohol of from 14 to 31 carbon atoms, a glyceryl ester of a fatty acid having from 10 to 22 carbon atoms, a cellulose ether, and a cellulose ester and said particles being not larger than 100 mesh and having a specific gravity at 20° C. related to water at 4° C. of from about 1 to about 2, an aqueous vehicle for said particles and a surface active agent to lower the surface tension of the water, said particles having a density of from about 100% to about 150% of said vehicle at 20° C.

References Cited in the file of this patent

UNITED STATES PATENTS

| 2,373,763 | Kuever et al. | Apr. 17, 1945 |
| 2,637,679 | Gaunt et al. | May 5, 1953 |
| 2,661,315 | Jurist et al. | Dec. 1, 1953 |

FOREIGN PATENTS

| 644,081 | Great Britain | Oct. 4, 1950 |
| 669,709 | Great Britain | Apr. 9, 1952 |
| 514,047 | Great Britain | Oct. 30, 1939 |
| 109,438 | Australia | Jan. 11, 1940 |

OTHER REFERENCES

Remington's Practice of Pharmacy, 11th ed., 1956, The Mack Publishing Co., Easton, Pa., p. 124.